(12) United States Patent
Potter

(10) Patent No.: US 11,937,636 B2
(45) Date of Patent: Mar. 26, 2024

(54) VAPOR PROVISION SYSTEMS

(71) Applicant: NICOVENTURES TRADING LIMITED, London (GB)

(72) Inventor: Mark Potter, London (GB)

(73) Assignee: NICOVENTURES TRADING LIMITED, London (GB)

( * ) Notice: Subject to any disclaimer, the term of this patent is extended or adjusted under 35 U.S.C. 154(b) by 497 days.

(21) Appl. No.: 17/309,202

(22) PCT Filed: Nov. 1, 2019

(86) PCT No.: PCT/GB2019/053112
§ 371 (c)(1),
(2) Date: May 6, 2021

(87) PCT Pub. No.: WO2020/095030
PCT Pub. Date: May 14, 2020

(65) Prior Publication Data
US 2022/0007719 A1    Jan. 13, 2022

(30) Foreign Application Priority Data
Nov. 6, 2018 (GB) ..................... 1818080

(51) Int. Cl.
*A24F 40/42* (2020.01)
*A24F 40/46* (2020.01)
*A24F 40/48* (2020.01)

(52) U.S. Cl.
CPC ............ *A24F 40/42* (2020.01); *A24F 40/46* (2020.01); *A24F 40/48* (2020.01)

(58) Field of Classification Search
CPC .......... A24F 40/42; A24F 40/44; A24F 40/46; A24F 40/48
See application file for complete search history.

(56) References Cited

U.S. PATENT DOCUMENTS 10,201,185 B2 *  2/2019  Bleloch ............... A61M 11/042
10,285,444 B2 *  5/2019  Clemens ............. H05B 1/0244
(Continued)

FOREIGN PATENT DOCUMENTS

KR      20130031550 A      3/2013
WO   WO-2012072264 A1     6/2012
(Continued)

OTHER PUBLICATIONS

International Preliminary Report on Patentability for Application No. PCT/GB2019/053112, dated Jan. 28, 2020, 13 pages.
(Continued)

*Primary Examiner* — Harshad C Patel
(74) *Attorney, Agent, or Firm* — Husch Blackwell LLP

(57) ABSTRACT

A vapor provision system includes a cartridge part configured for use with a reusable part and a sealing element, the cartridge part including a cartridge housing, a reservoir formed within the cartridge housing for containing liquid for vaporization; a vaporizer disposed within an air path forming a vaporization chamber within the cartridge housing; and a liquid transport element arranged within a channel from the reservoir to the vaporization chamber to transport liquid from the reservoir to the vaporizer for vaporization, the liquid transport element being formed with the vaporizer in the vaporization chamber to convey the vapor in use when air is drawn by a user through the air path, and the sealing element comprises a plurality of fingers projecting outwardly opposite one another from one end of a stalk.

8 Claims, 9 Drawing Sheets

(56) References Cited

U.S. PATENT DOCUMENTS

| | | | | |
|---|---|---|---|---|
| 2015/0245669 A1* | 9/2015 | Cadieux | .................. | A24F 40/50 |
| | | | | 131/329 |
| 2016/0109115 A1* | 4/2016 | Lipowicz | ................. | H05B 6/10 |
| | | | | 392/395 |
| 2016/0331039 A1 | 11/2016 | Thorens et al. | | |
| 2017/0006922 A1* | 1/2017 | Wang | ....................... | H05B 3/46 |
| 2018/0029782 A1 | 2/2018 | Zuber et al. | | |
| 2020/0260794 A1* | 8/2020 | Angell | ..................... | D02G 3/44 |
| 2020/0288770 A1* | 9/2020 | Potter | ..................... | A24F 40/30 |
| 2020/0324066 A1* | 10/2020 | Potter | ..................... | H04L 12/10 |
| 2022/0273045 A1* | 9/2022 | Poynton | .................. | A24F 40/53 |

FOREIGN PATENT DOCUMENTS

| | | | |
|---|---|---|---|
| WO | WO-2017163045 A1 | | 9/2017 |
| WO | WO-2017199214 A1 | | 11/2017 |
| WO | WO-2018234505 A1 | | 12/2018 |

OTHER PUBLICATIONS

Search Report under Section 17(5) for Great Britain Application No. GB1818080.2, dated Apr. 12, 2019, 4 pages.

\* cited by examiner

VAPOR PROVISION SYSTEMS

PRIORITY CLAIM

The present application is a National Phase entry of PCT Application No. PCT/GB2019/053112, filed Nov. 1, 2019, which claims priority from GB Patent Application No. 1818080.2, filed Nov. 6, 2018, each of which is hereby fully incorporated herein by reference.

FIELD

The present disclosure relates to vapor provision systems such as nicotine delivery systems (e.g. electronic cigarettes and the like).

BACKGROUND

Electronic vapor provision systems such as electronic cigarettes (e-cigarettes) generally contain a vapor precursor material, such as a reservoir of a source liquid containing a formulation, typically including nicotine, from which a vapor is generated for inhalation by a user, for example through heat vaporization . Thus, a vapor provision system will typically comprise a vaporization chamber containing a vaporizer , e.g. a heating element, arranged to vaporize a portion of precursor material to generate a vapor in the vaporization chamber. As a user inhales on the device and electrical power is supplied to the vaporizer, air is drawn into the device through an inlet hole and into the vaporization chamber where the air mixes with vaporized precursor material to form a condensation aerosol. There is an air channel connecting the vaporization chamber and an opening in the mouthpiece so the air drawn through the vaporization chamber as a user inhales on the mouthpiece continues along the flow path to the mouthpiece opening, carrying the vapor with it for inhalation by the user.

For electronic cigarettes using a liquid vapor precursor (e-liquid) there is a risk of the liquid leaking. This is the case for liquid-only electronic cigarettes and hybrid devices (electronic cigarettes with tobacco or another flavor element separate from the vapor generation region). Liquid-based e-cigarettes will typically have a capillary wick for transporting liquid from within a liquid reservoir to a vaporizer located in the air channel connecting from the air inlet to the vapor outlet for the e-cigarette. Thus the wick typically passes through an opening in a wall that separates the liquid reservoir from the air channel in the vicinity of the vaporizer.

FIG. 1 schematically shows a cross-section of a portion of a conventional electronic cigarette in the vicinity of its vaporization chamber 2, i.e. where vapor is generated during use. FIG. 1 provides an illustration of a conventional arrangement with which the present technique finds application. The electronic cigarette comprises a central air channel 4 through a surrounding annular liquid reservoir 6. The annular liquid reservoir 6 is defined by an inner wall 8 and an outer wall 10, which may both be cylindrical (the inner wall 8 separates the liquid reservoir 6 from the air channel, and so in that sense the inner wall 8 also defines the air channel). The electronic cigarette comprises a vaporizer 12 in the form of a resistive heating coil. The coil 12 is wrapped around a capillary wick 14. Each end of the capillary wick 14 extends into the liquid reservoir 6 through an opening 16 in the inner wall 8. The wick 14 is thus arranged to convey liquid from within the liquid reservoir 6 to the vicinity of the coil 12 by capillary action. During use an electric current is passed through the coil 12 so that it is heated and vaporizes a portion of liquid from the capillary wick 14 adjacent the coil 12 to generate vapor in the vaporization chamber 2 for user inhalation. The vaporized liquid is then replaced by more liquid being drawn along the wick 14 from the liquid reservoir 6 by capillary action.

In some arrangements the wick draws the liquid from the reservoir by capillary action into the vaporization chamber where it can be vaporized. Because the reservoir inner wall 8 has openings 16 to allow liquid to be drawn out of the reservoir 6 to the vaporizer 12, there is a corresponding risk of leakage from this part of the electronic cigarette. Leakage is undesirable both from the perspective of the end user naturally not wanting to get the e-liquid on their hands or other items, and also from a reliability perspective, since leakage has the potential to damage the electronic cigarette itself, for example due to corrosion of components which are not intended to come into contact the liquid.

It is not straightforward to ensure there is a good match between the size of the openings 16 and the size of the wick 14 where it passes through the openings. For example, from a manufacturing perspective, electronic cigarettes are mass produced items and the openings themselves are often defined by how multiple components fit together, and this means manufacturing and assembly variations can impact how reliably the size of openings can be reproduced from device to device. What is more, the geometry of the wicks themselves can be variable. For example, a wick will often comprise a bundle of fibers twisted together, for example glass fibers or organic cotton fibers, and this naturally means the outer profile of the wick is subject to variation, both along its length, and from wick to wick. Consequently, it is not always possible to reliably achieve the desired degree of sealing between the wick 14 and the openings 60 in the wall 8 of the reservoir 6. This can result in some devices having an increased risk of leakage (where openings are too large relative to the wick) and some devices having an increased risk of insufficient wicking/dry-out (where openings are too small relative to the wick).

Various approaches are described herein which seek to help address or mitigate at least some of the issues discussed above.

SUMMARY

According to a first aspect of certain embodiments there is provided a vapor provision system comprising a cartridge part configured for use with a reusable part and a sealing element, the cartridge part comprising a cartridge housing, a reservoir formed within the cartridge housing for containing liquid for vaporization, a vaporizer disposed within an air path forming a vaporization chamber within the cartridge housing; and a liquid transport element arranged within a channel from the reservoir to the vaporization chamber to transport liquid from the reservoir to the vaporizer for vaporization, the liquid transport element being formed with the vaporizer in the vaporization chamber to convey the vapor in use when air is drawn by a user through the air path. The sealing element comprises a plurality of fingers projecting outwardly opposite one another from one end of a stalk, wherein when located in a sealing position the fingers of the sealing element are configured to extend into the channel to reduce a cross-sectional area of the liquid transport element in the channel and the stalk of the sealing element extends proud of the cartridge part so that the sealing element can be removed by the user before the cartridge part is used.

Embodiments of the present technique can provide a sealing element for use with a cartridge part of a vapor provision system, in which the sealing element is configured to include resiliently deformable fingers formed at one end of a stalk, the fingers being resiliently deformable so that, when disposed in a sealing position within the cartridge part, the fingers can enter the channel through which the liquid transport element passes under a biasing force produced by the resiliently deformable structure of the fingers so that the wick is pinched by each finger at the point where the liquid transport element (wick) enters the channel thereby restricting or reducing liquid from leaking during transportation.

It will be appreciated that features and aspects of the disclosure described herein in relation to the first and other aspects of the disclosure are equally applicable to, and may be combined with, embodiments of the disclosure according to other aspects of the disclosure as appropriate, and not just in the specific combinations described above.

BRIEF DESCRIPTION OF THE DRAWINGS

Embodiments of the disclosure will now be described, by way of example only, with reference to the accompanying drawings, in which.

DETAILED DESCRIPTION

Figure 1:
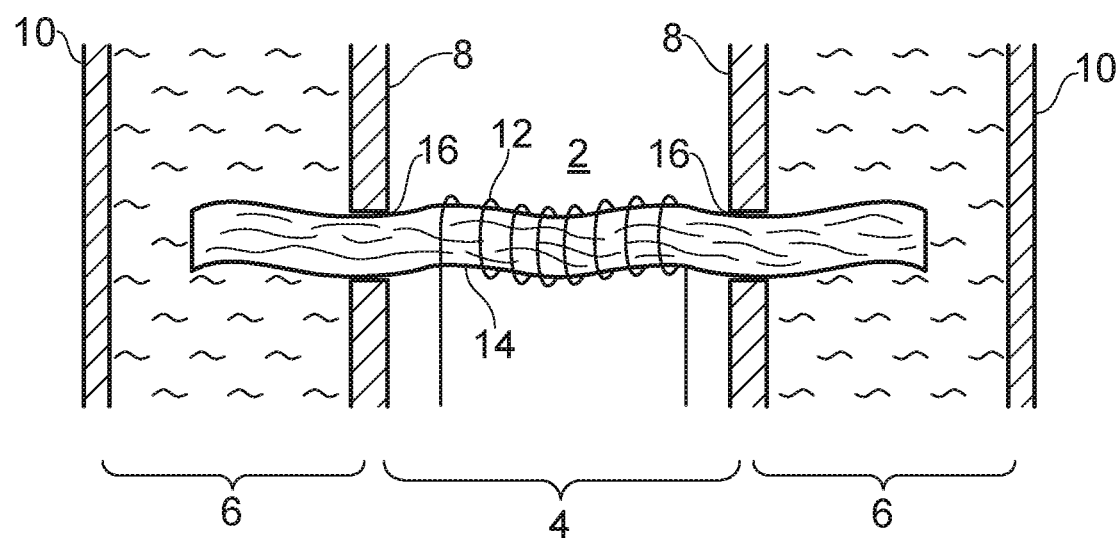
FIG. 1 represents in schematic cross-section a vapor generation region of a conventional vapor provision system.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The present disclosure relates to vapor provision systems, which may also be referred to as aerosol provision systems, such as e-cigarettes. Throughout the following description the term "e-cigarette" or "electronic cigarette" may sometimes be used, but it will be appreciated this term may be used interchangeably with vapor provision system/device and electronic vapor provision system/device. Furthermore, and as is common in the technical field, the terms "vapor" and "aerosol", and related terms such as "vaporize", "volatilize" and "aerosolize", may generally be used interchangeably.

Vapor V provision systems (e-cigarettes) often, though not always, comprise a modular assembly including both a reusable part (control unit part) and a replaceable (disposable) cartridge part. Often the replaceable cartridge part will comprise the vapor precursor material and the vaporizer and the reusable part will comprise the power supply (e.g. rechargeable battery) and control circuitry. It will be appreciated these different parts may comprise further elements depending on functionality. For example, the reusable device part may comprise a user interface for receiving user input and displaying operating status characteristics, and the replaceable cartridge part may comprise a temperature sensor for helping to control temperature. Cartridges are electrically and mechanically coupled to a control unit for use, for example using a screw thread, latching or bayonet fixing with appropriately engaging electrical contacts. When the vapor precursor material in a cartridge is exhausted, or the user wishes to switch to a different cartridge having a different vapor precursor material, a cartridge may be removed from the control unit and a replacement cartridge attached in its place. Devices conforming to this type of two-part modular configuration may generally be referred to as two-part devices. It is also common for electronic cigarettes to have a generally elongate shape. For the sake of providing a concrete example, certain embodiments of the disclosure described herein will be taken to comprise this kind of generally elongate two-part device employing disposable cartridges. However, it will be appreciated the underlying principles described herein may equally be adopted for different electronic cigarette configurations, for example single-part devices or modular devices comprising more than two parts, refillable devices and single-use disposable devices, as well as devices conforming to other overall shapes, for example based on so-called box-mod high performance devices that typically have a more box-like shape. More generally, it will be appreciated certain embodiments of the disclosure are based on approaches for seeking to help more reliably form a seal for an opening in a reservoir wall through which a wick passes in accordance with the principles described herein, and other constructional and functional aspects of electronic cigarettes implementing approaches in accordance with certain embodiments of the disclosure are not of primary significance and may, for example, be implemented in accordance with any established approaches.

Figure 2:
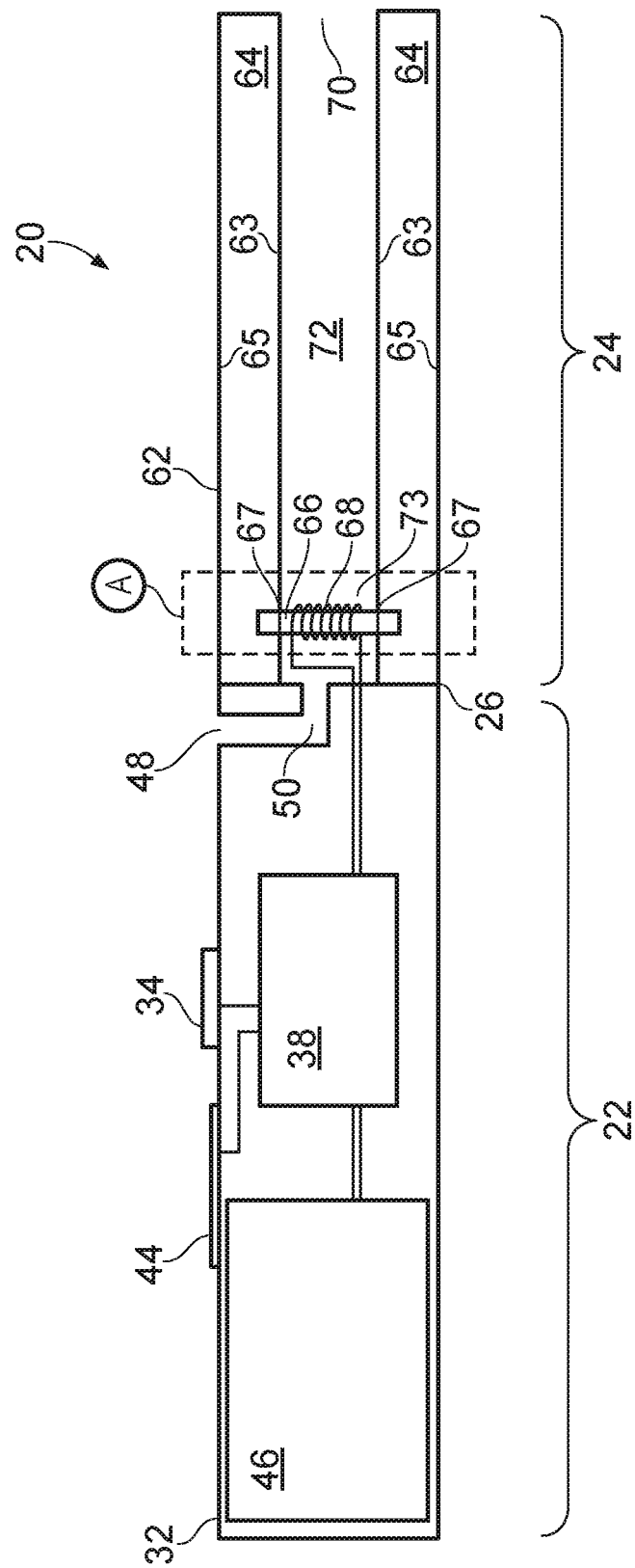
FIG. 2 represents in schematic cross-section a vapor provision system according to certain embodiments of the disclosure.

FIG. 2 is a cross-sectional view through an example e-cigarette 20 in accordance with certain embodiments of the disclosure. The e-cigarette 20 comprises two main components, namely a reusable part 22 and a replaceable/disposable cartridge part 24. In normal use the reusable part 22 and the cartridge part 24 are releasably coupled together at an interface 26. When the cartridge part is exhausted or the user simply wishes to switch to a different cartridge part, the cartridge part may be removed from the reusable part and a replacement cartridge part attached to the reusable part in its place. The interface 26 provides a structural, electrical and air path connection between the two parts and may be established in accordance with conventional techniques, for example based around a screw thread, latch mechanism, or bayonet fixing with appropriately arranged electrical contacts and openings for establishing the electrical connection and air path between the two parts as appropriate. The specific manner in which the cartridge part 24 mechanically couples to the reusable part 22 is not significant to the principles described herein, but for the sake of a concrete example is assumed here to comprise a latching mechanism, for example with a portion of the cartridge being received in a corresponding receptacle in the reusable part with cooperating latch engaging elements (not represented in FIG. 2). It will also be appreciated the interface 26 in some implementations may not support an electrical and/or air path connection between the respective parts. For example, in some implementations a vaporizer may be provided in the reusable part rather than in the cartridge part, or the transfer of electrical power from the reusable part to the cartridge part may be wireless (e.g. based on electromagnetic induction), so that an electrical connection between the reusable part and the cartridge part is not needed. Furthermore, in some implementations the airflow through the electronic cigarette might not go through the reusable part so that an air path connection between the reusable part and the cartridge part is not needed.

The cartridge part 24 may in accordance with certain embodiments of the disclosure be broadly conventional apart from where modified in accordance with the approaches described herein in accordance with certain embodiments of the disclosure. In FIG. 2, the cartridge part 24 comprises a cartridge housing 62 formed of a plastics material. The cartridge housing 62 supports other components of the cartridge part and provides the mechanical interface 26 with the reusable part 22. The cartridge housing is generally circularly symmetric about a longitudinal axis along which the cartridge part couples to the reusable part 22. In this example the cartridge part has a length of around 4 cm and a diameter of around 1.5 cm. However, it will be appreciated the specific geometry, and more generally the overall shape and materials used, may be different in different implementations.

Within the cartridge housing 62 is a reservoir 64 that contains liquid vapor precursor material. The liquid vapor precursor material may be conventional, and may be referred to as e-liquid. The liquid reservoir 64 in this example has an annular shape which is generally circularly symmetric with an outer wall 65 defined by the cartridge housing 62 and an inner wall 63 that defines an air path 72 through the cartridge part 24. The reservoir 64 is closed at each end by end walls to contain the e-liquid. The reservoir 64 may be formed generally in accordance with conventional manufacturing techniques, for example it may comprise a plastics material and be integrally molded with the cartridge housing 62.

The cartridge part further comprises a wick (liquid transport element) 66 and a heater (vaporizer) 68. In this example the wick 66 extends transversely across the cartridge air path 72 with its ends extending into the reservoir 64 of e-liquid through openings 67 in the inner wall of the reservoir 64. As discussed further herein, in accordance with certain embodiments of the disclosure a collar (not shown in FIG. 2) is mounted around the liquid transport element where it passes through each opening in the wall of the reservoir. The wick 66 and heater 68 are arranged in the cartridge air path 72 such that a region of the cartridge air path 72 around the wick 66 and heater 68 in effect defines a vaporization region 73 for the cartridge part. E-liquid in the reservoir 64 infiltrates the wick 66 through the ends of the wick extending into the reservoir 64 and is drawn along the wick by surface tension/capillary action (i.e. wicking). The heater 68 in this example comprises an electrically resistive wire coiled around the wick 66. In this example the heater 68 comprises a nickel chrome alloy (Cr20Ni80) wire and the wick 66 comprises a glass fiber bundle, but it will be appreciated the specific heater configuration is not significant to the principles described herein. In use electrical power may be supplied to the heater 68 to vaporize an amount of e-liquid (vapor precursor material) drawn to the vicinity of the heater 68 by the wick 66. Vaporized e-liquid may then become entrained in air drawn along the cartridge air path 72 from the vaporization region 73 towards the mouthpiece outlet 70 for user inhalation.

The rate at which e-liquid is vaporized by the vaporizer (heater) 68 will generally depend on the amount (level) of power supplied to the heater 68. Thus electrical power can be applied to the heater 66 to selectively generate vapor from the e-liquid in the cartridge part 24, and furthermore, the rate of vapor generation can be changed by changing the amount of power supplied to the heater 68, for example through pulse width and/or frequency modulation techniques.

The reusable part 22 may be conventional and comprises an outer housing 32 with an opening that defines an air inlet 48 for the e-cigarette, a battery 46 for providing operating power for the electronic cigarette, control circuitry 38 for controlling and monitoring the operation of the electronic cigarette, a user input button 34 and a visual display 44.

The outer housing 32 may be formed, for example, from a plastics or metallic material and in this example has a circular cross-section generally conforming to the shape and size of the cartridge part 24 so as to provide a smooth transition between the two parts at the interface 26. In this example, the reusable part has a length of around 8 cm so the overall length of the e-cigarette when the cartridge part and reusable part are coupled together is around 12 cm. However, and as already noted, it will be appreciated that the overall shape and scale of an electronic cigarette implementing an embodiment of the disclosure is not significant to the principles described herein.

The air inlet 48 connects to an air path 50 through the reusable part 22. The reusable part air path 50 in turn connects to the cartridge air path 72 across the interface 26 when the reusable part 22 and cartridge part 24 are connected together. Thus, when a user inhales on the mouthpiece opening 70, air is drawn in through the air inlet 48, along the reusable part air path 50, across the interface 26, through the vapor generation region in the vapor generation region 73 in the vicinity of the atomizer 68 (where vaporized e-liquid becomes entrained in the air flow), along the cartridge air path 72, and out through the mouthpiece opening 70 for user inhalation.

The battery 46 in this example is rechargeable and may be of a conventional type, for example of the kind normally used in electronic cigarettes and other applications requiring provision of relatively high currents over relatively short periods. The battery 46 may be recharged through a charging connector in the reusable part housing 32, for example a USB connector (not shown).

The user input button 34 in this example is a conventional mechanical button, for example comprising a spring mounted component which may be pressed by a user to establish an electrical contact. In this regard, the input button may be considered an input device for detecting user input and the specific manner in which the button is implemented is not significant. For example, other forms of mechanical button(s) or touch-sensitive button(s) (e.g. based on capacitive or optical sensing techniques) may be used in other implementations.

The display 44 is provided to provide a user with a visual indication of various characteristics associated with the electronic cigarette, for example current power setting information, remaining battery power, and so forth. The display may be implemented in various ways. In this example the display 44 comprises a conventional pixilated LCD screen that may be driven to display the desired information in accordance with conventional techniques. In other implementations the display may comprise one or more discrete indicators, for example LEDs, that are arranged to display the desired information, for example through particular colors and/or flash sequences. More generally, the manner in which the display is provided and information is displayed to a user using the display is not significant to the principles described herein. For example, some embodiments may not include a visual display and may include other means for providing a user with information relating to operating characteristics of the electronic cigarette, for example using audio signaling or haptic feedback, or may not include any means for providing a user with information relating to operating characteristics of the electronic cigarette.

The control circuitry 38 is suitably configured/programmed to control the operation of the electronic cigarette to provide functionality in accordance with the established techniques for operating electronic cigarettes. For example, the control circuitry 38 may be configured to control a supply of power from the battery 46 to the heater/vaporizer 68 to generate vapor from a portion of the e-liquid in the cartridge part 24 for user inhalation via the mouthpiece outlet 70 in response to user activation of the input button 34, or in other implementations in response to other triggers, for example in response to detecting user inhalation. As is conventional, the control circuitry (processor circuitry) 38 may be considered to logically comprise various sub-units/circuitry elements associated with different aspects of the electronic cigarette's operation, for example user input detection, power supply control, display driving, and so on. It will be appreciated the functionality of the control circuitry 38 can be provided in various different ways, for example using one or more suitably programmed programmable computer(s) and/or one or more suitably configured application-specific integrated circuit(s)/circuitry/chip(s)/chipset(s) configured to provide the desired functionality.

The vapor provision system/electronic cigarette represented in FIG. 2 differs from conventional electronic cigarettes in the manner in which the liquid transport element/wick 66 couples into the reservoir 64 containing liquid for vaporization. In particular, in accordance with certain embodiments of the disclosure, the liquid transport element extends into the reservoir through an opening in a wall of the reservoir and has a collar mounted around the liquid transport element where it passes through the opening in the wall of the reservoir. Providing a collar around the wick is proposed to help with sealing the openings in the wall of the reservoir through which the wick passes. In particular, the collar may add rigidity to the wick so that the opening in the reservoir wall may be configured to press against the collar to help with providing a seal with a reduced risk of overly compressing the wick itself, for example in an electronic cigarette in which the size of the opening is at the smaller end of the tolerance range. Because of this, the nominal size of the opening may be made smaller than it might otherwise be for a simple wick having the same size as the collar. Furthermore, because the collar may comprise a single element, the size of the through hole that the wick passes through is not reliant on how multiple separate parts fit together and so maybe more reliably formed to suit the diameter of the wick (i.e. so the wick forms a snug fit within the collar through-hole). In some cases the collar may be an element which is mounted to the wick during parts assembly, and in other cases the collar may in fact be integrally formed with the wick, for example through a molding process. That is to say, in some example implementations, the collar may be a molded element, and may be molded with the wick in place.

As shown in FIG. 2 as a functional arrangement, the liquid transport element or wick 66 extends into the reservoir 64 through annular openings 67 in an area which will be referred to as a vaporization chamber 98. However as will be appreciated, the cartridge part 24 may be made and sold separately from the reusable part 22 and may be required to be transported before use, in which case liquid from the reservoir 64 may inadvertently be expressed by gravity or motion through the annular openings 67 which is clearly disadvantageous.

Figure 3:
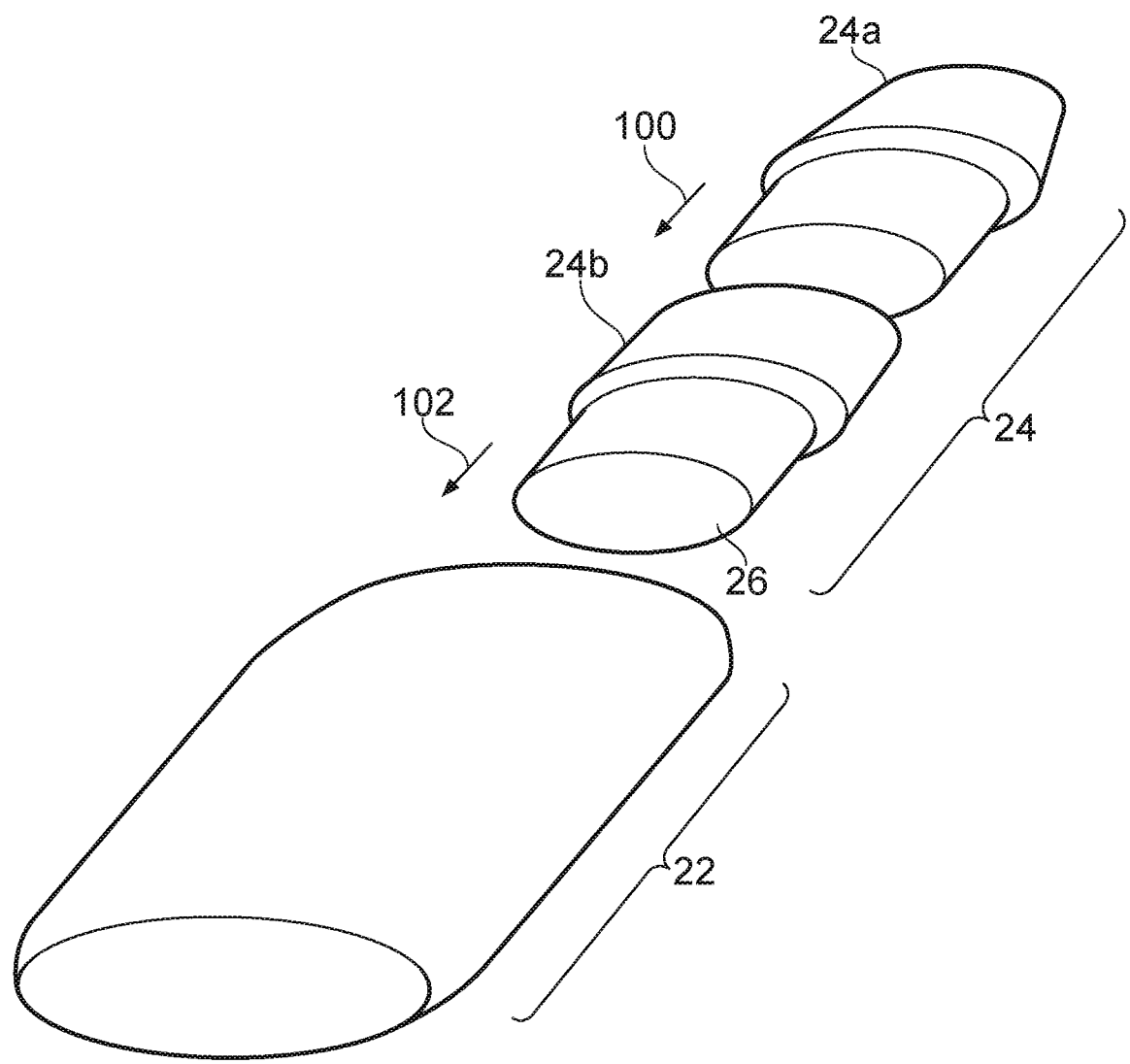
FIG. 3 is a three-dimensional representation of different components of an e-cigarette comprising a reusable part, a cartridge part, and a mouthpiece

A more practical example of an e-cigarette conforming to the functional representation shown in FIG. 2 is provided in FIG. 3 as a three dimensional representation. As shown in FIG. 3 an e-cigarette is shown to comprise the reusable part 22 and the cartridge part 24 which corresponds to the representation shown in FIG. 2.

Figure 4:
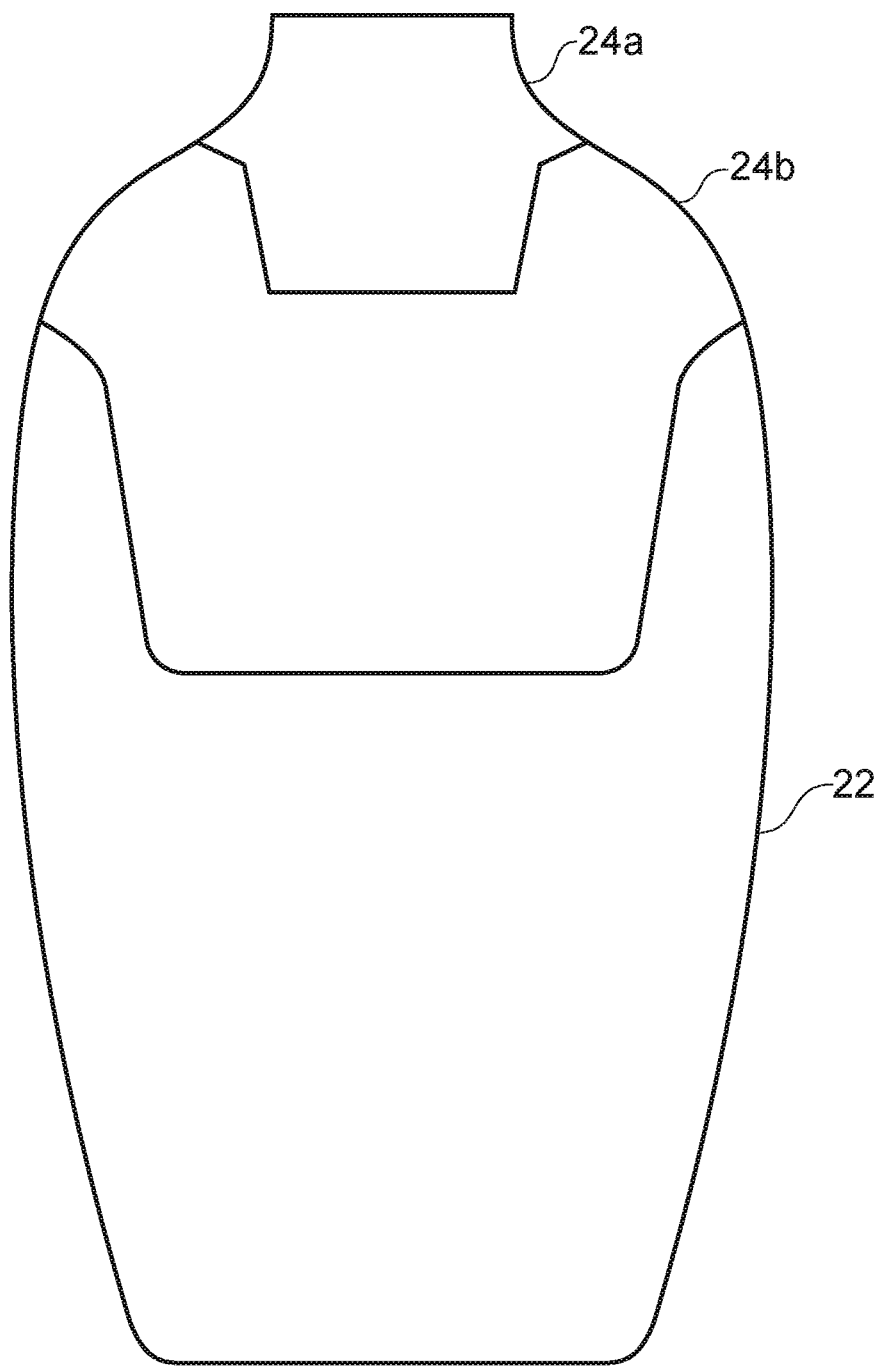
FIG. 4 is a plan view of the e-cigarette shown in FIG. 3 showing each of the different parts, when the e-cigarette is assembled together.

Embodiments of the present disclosure concern the transportation of the cartridge part 24 and in particular a part of the cartridge part which contains the e-liquid. As illustrated in FIG. 3, the cartridge part 24 in one example may be comprised of two parts 24*a*, 24*b* which as shown in FIG. 3 by arrows 100, 102 are assembled together when the e-cigarette is to be used. As illustrated by FIG. 4, a plan view of the assembled e-cigarette shows the parts of the e-cigarette of FIG. 3 assembled together. As shown in FIGS. 3 and 4, the cartridge part includes the mouthpiece section 24*a* and a cartomizer 24*b*. The cartomizer 24*b* includes the e-liquid within a reservoir 64 as well as the wick and the heater 68. An end of the cartomizer 24*b* therefore forms the interface 26 shown in FIG. 2.

Figure 5:
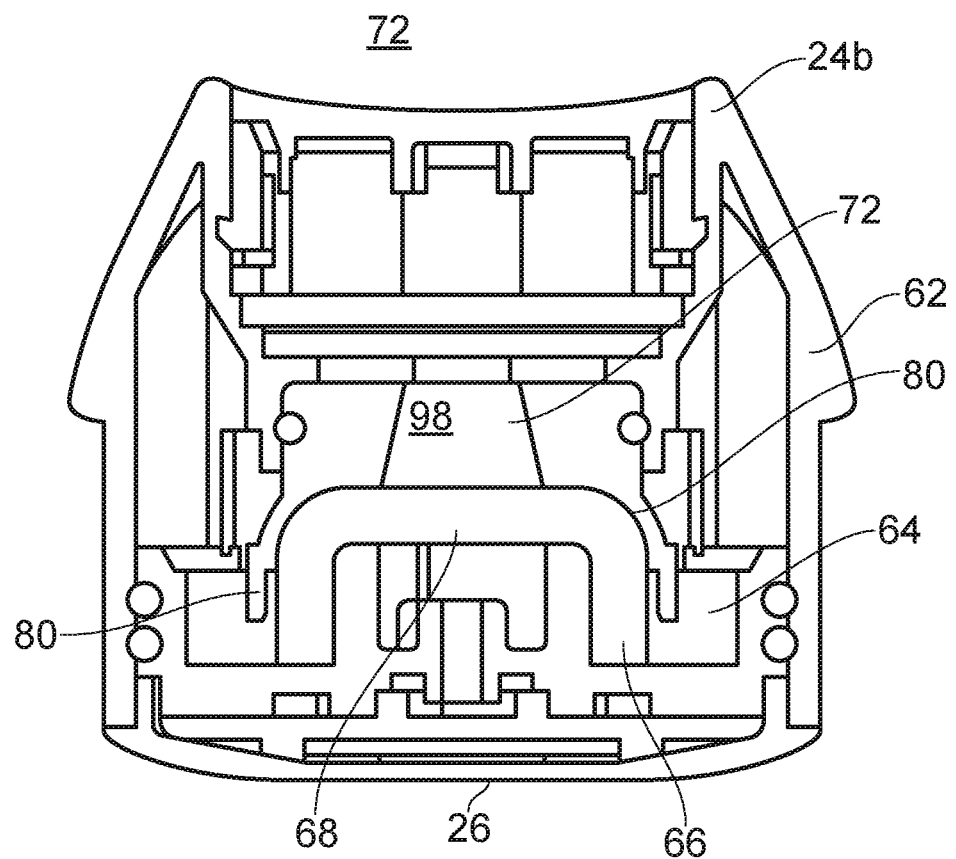
FIG. 5 is a cross-sectional view of one example of a cartridge part of the e-cigarette shown in FIG. 3 and FIG. 4.

The mouthpiece part 24*a* shown in FIG. 3 may include some flavoring agent which when combined with the vapor generated by the cartomizer 24*b* delivers a particular flavor to the user. For example, the mouthpiece 24*a* could include some tobacco product and therefore the mouthpiece 24*a* could be referred to as a "tobacco pod". A more detailed diagram of a cross-sectional view of a cartomizer 24*b* shown in FIGS. 3 and 4 is shown in FIG. 5. FIG. 5 shows elements which are shown functionally in FIG. 2 and so bear the corresponding reference numerals. For example as shown in FIG. 5 the cartomizer 24*b* include a cartomizer housing 62 which is configured to include a reservoir 64 and a liquid transport element or wick 66. A heater 68 is shown as for the example of FIG. 2, but due to the cross-sectional view is not easily illustrated because the heater 68 includes a plurality of coiled wires, which are being viewed in cross-section. The heater 68 is formed with the liquid transport element or wick 66 within a vaporization chamber 98. In use, as explained above, heat is applied to the wick 66 to generate a vapor from the e-liquid within the vapor chamber 98, which draws the e-liquid from the reservoir 64 and the vapor passes with user inhalation through the air channel 72, engages with the flavoring agent present in the mouthpiece or tobacco pod 24*a* to deliver a flavored vapor to the user.

Figure 6:
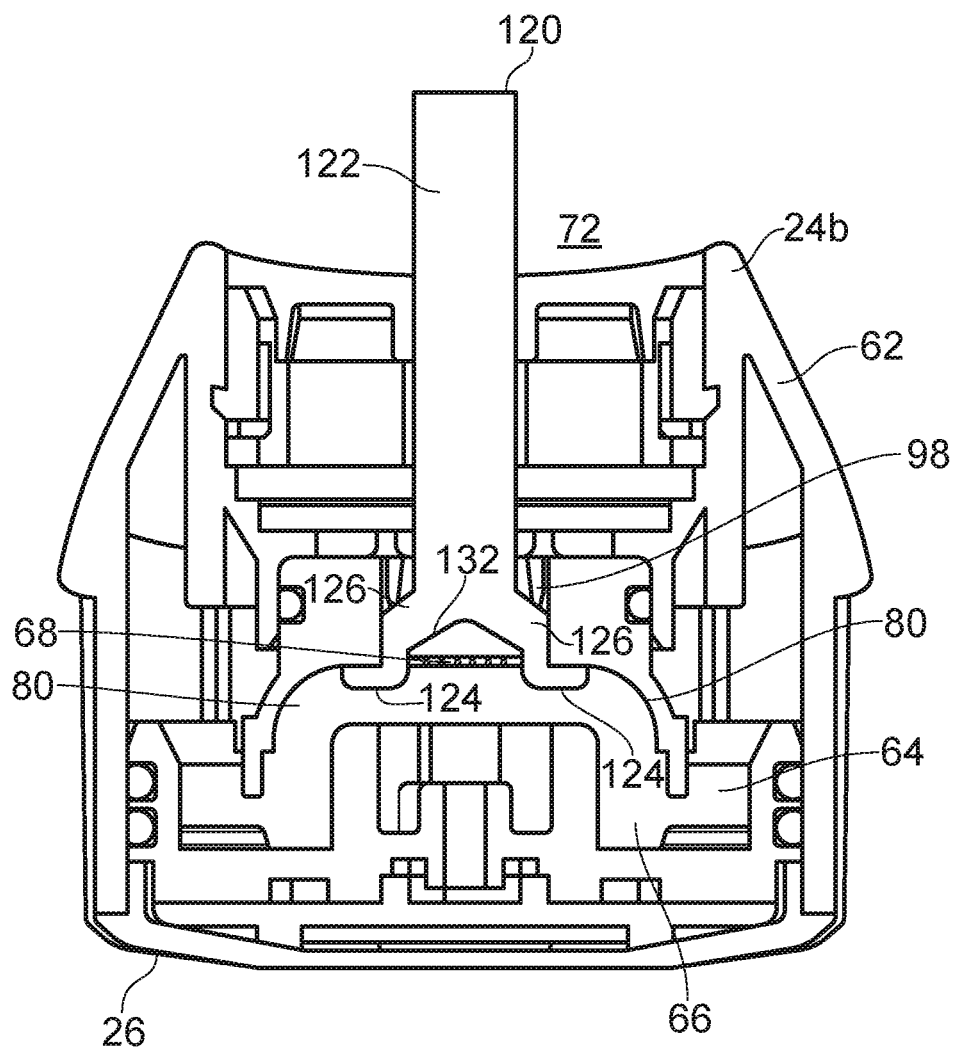
FIG. 6 is a cross-sectional view of the cartridge part of FIG. 5 with a sealing element disposed in a sealing position within the cartridge part.

Embodiments of the present technique can provide an arrangement for improving transportation of a cartomizer and in particular reducing a likelihood that e-liquid may be expressed from the reservoir 64 when transported or moved prior to use. FIG. 6 shows a more detailed diagram of a cartomizer 24*b* shown in FIG. 5, but including a sealing element 120. The sealing element 120 is comprised of a stalk 122 with two fingers 124 disposed at the end of the stalk 122 and connected to the stalk 122 by connecting arms 126. The fingers 124 are configured to extend outwardly from the end of the stalk 122. In one example the fingers 124 are elements formed to project outwardly substantially perpendicular to the axis of the stalk 122.

In use, the sealing element 120 is positioned during manufacture so that the fingers 124 engage with the channel 80 either side of the heater 68 to compress the liquid transporting element or wick 66 either side of the heater 68 thereby preventing or inhibiting egress of liquid on or around the heater 68 in the vaporization chamber 98. In one example, the sealing element 120 may be installed during assembly of the cartomizer 24b so that the sealing element 120 is in a sealing position when it is received by the user. For example, the sealing element 120 can therefore be positioned in the sealing position as the liquid transport element or wick 66 is being located in the channel 80. The sealing element is therefore positioned as the cartomizer 24b is assembled. To use the cartomizer 24b, the user simply grasps the stalk 122 and pulls the sealing element from the cartomizer 24b so that the e-liquid can flow from the reservoir to the heater 68 through the liquid transport element or wick 66.

As an alternative, the sealing element 120 can be installed in the cartomizer 24b by pushing it through the air path 72 into the vaporization chamber 98. The fingers 124 engage with the walls of the vaporization chamber 98 as the vaporization chamber 98 narrows, causing the fingers to be compressed as a result of a resiliently deformable configuration of the fingers 124 and the connecting arms 126. As the sealing element 120 is moved into a sealing position (as shown in FIG. 6) a biasing force provided by the resiliently deformable configuration of the fingers 124 and connecting arm 126 force the fingers 124 into the channel 80.

In some examples, the sealing element 120 may be connected to a package, such as a blister pack, which may form an enclosure around cartridge part 24b for providing protection to the cartridge part during storage and transport etc. The portion of the stalk 122 extending proud of the cartridge part 24b may be formed as a component of the pack prior to installation in the cartridge (i.e. via a particular mold) or may be attached after installation via conventional means such as welding or gluing etc. The force connecting the sealing element 120 to the package is greater than the force engaging the fingers 124 in the channel 80 and, hence, wherein when the cartridge part is removed from (e.g. displaced relative to) the package the sealing element is retained with the package and removed from the cartridge part. In these examples, to use the cartomizer 24b, the user simply grasps the package and pulls the package from the cartomizer 24b so that the e-liquid can flow from the reservoir to the heater 68 through the liquid transport element or wick 66.

As will be appreciated, a most likely location of egress of e-liquid from the cartomizer 24b is in the vaporization chamber 98 on or around the area of the heater 68 where the wick 66 passes into the air channel 72. By configuring a sealing element 120 with the fingers 124 which are adapted and configured to enter the channel 80 within which the wick 66 passes from the reservoir 64 to the heater 68, the wick is compressed, when the sealing element is in the sealing position at a point where the wick enters the air path 72 in the vaporization chamber 98 thereby preventing or at least reducing an amount of liquid egress from the cartomizer 24b.

Figure 7:
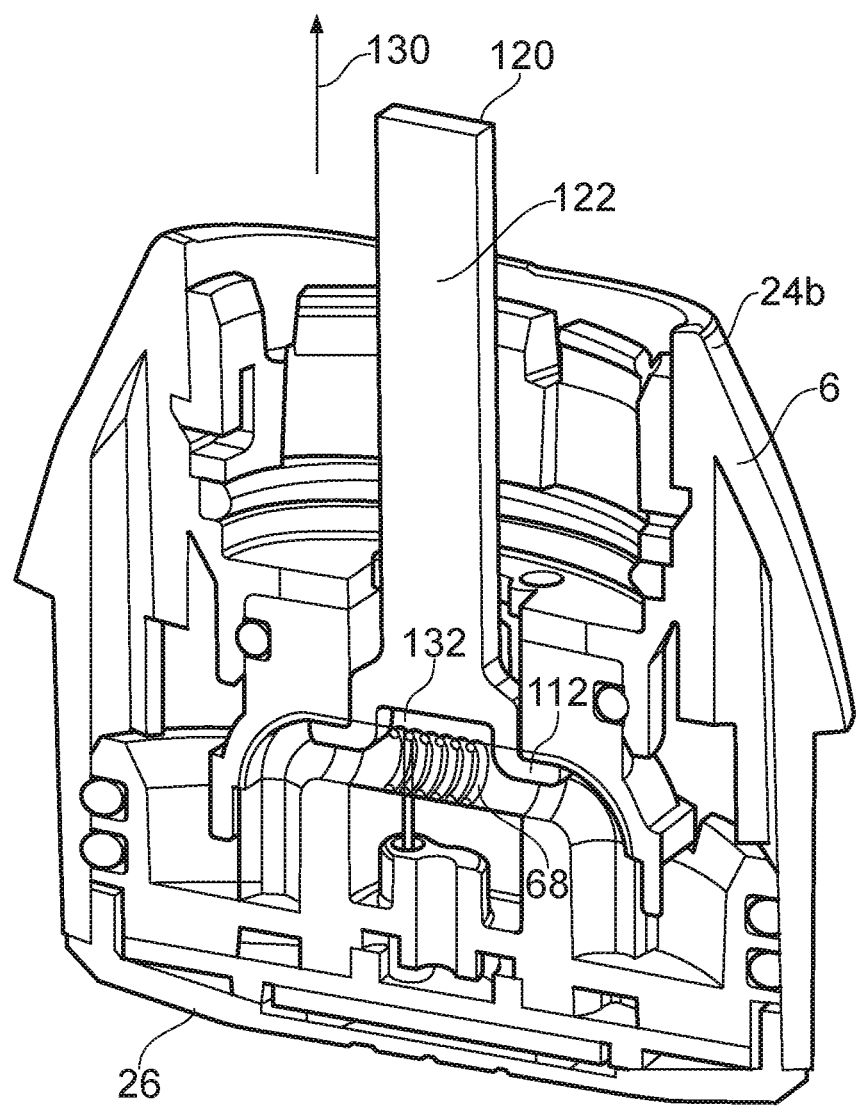
FIG. 7 is a three dimensional representation of a cross-sectional view of a cartridge part with the sealing part shown in FIG. 6 disposed in a sealing position.

FIG. 7 shows a three dimensional representation of a cross-sectional view of the cartridge part 24b with the sealing element 120 disposed in the cartomizer part 24b in the sealing position. As represented by an arrow 130, before use of the cartridge part 24b, the sealing element 128 is pulled from the cartomizer through the air path 72.

Figures 8A, 8B:
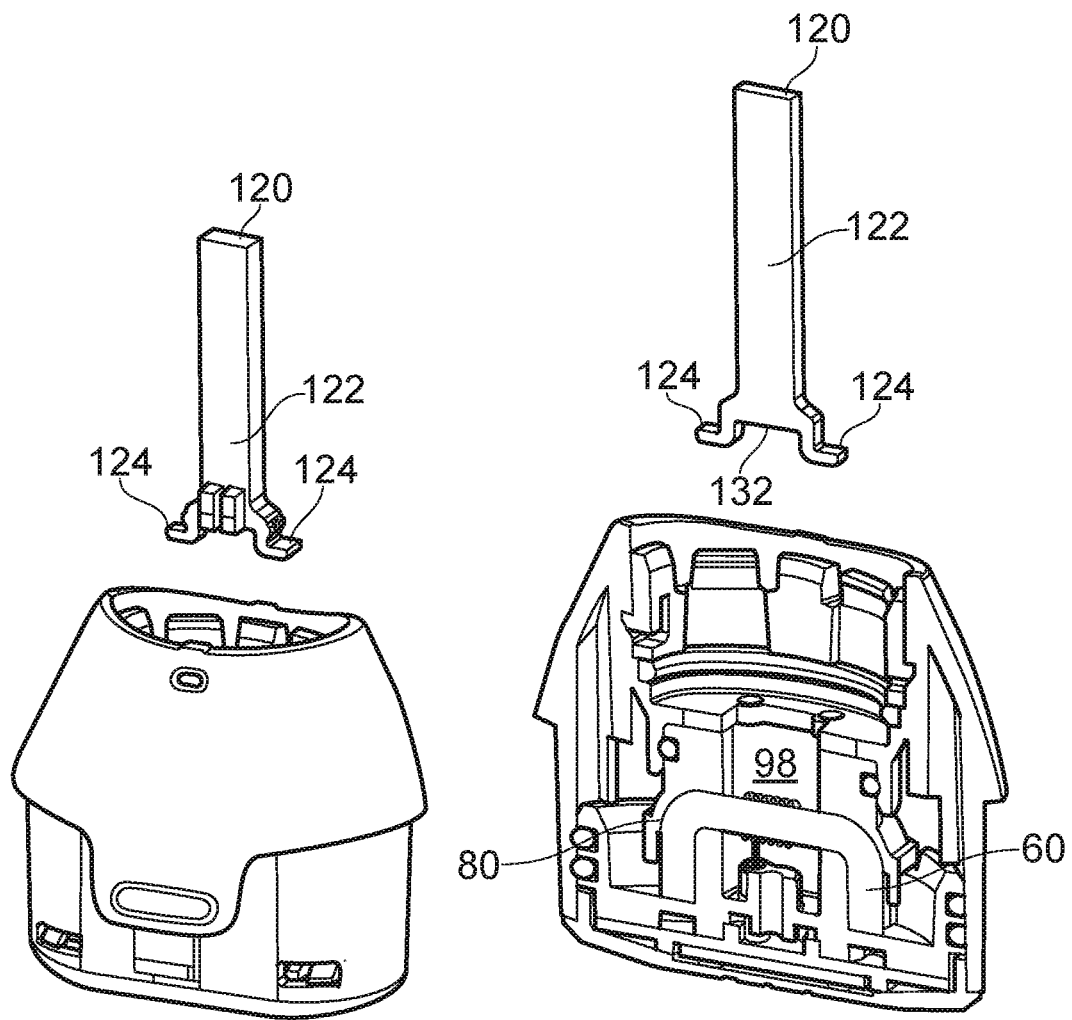
FIG. 8a shows a three dimensional view of the cartridge part of FIGS. 5, 6 and 7, with the sealing element removed.
FIG. 8b is a three dimensional view of a cross-section of the cartridge part 24b with and sealing element removed.
Figure 8C:
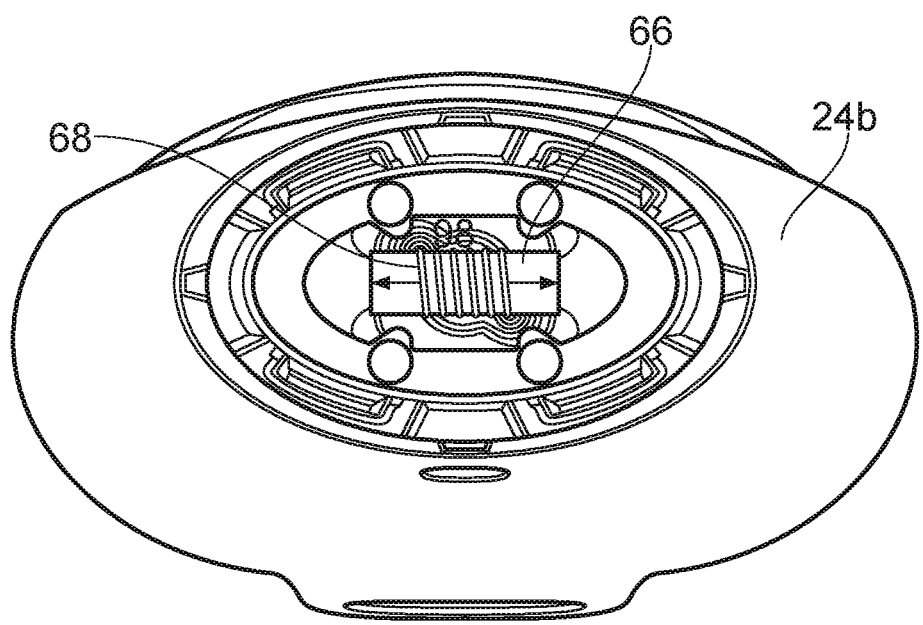
FIG. 8c is a plan view of the cartridge part 24b looking down into the vaporization chamber.

FIG. 8a shows a three dimensional view of the cartridge part 24b, with the sealing element removed, whereas FIG. 8b is a three dimensional view of a cross-section of the cartridge part 24b with and sealing element removed, and FIG. 8c is a plan view of the cartridge part 24b looking down into the vaporization chamber 98.

As will be appreciated from FIGS. 8a, 8b and 8c, the fingers 124 are configured to pass into the channel 80 either side of the heater 68 to compress the wick 66 at either point where the wick passes from the channel 80 into the heater 68 in the vicinity of the vaporization chamber 98 and the air channel 72. Furthermore a recess 132 at the end of the sealing element 120 which extends into the stalk 122 from a plane of the fingers 124 is configured to accommodate the heater 68. The recess 132 within the sealing element 120 is configured so that when the sealing element 120 is disposed in the cartomizer 24b in the sealing position, the sealing element 120 does not engage or apply pressure to the heating element 68. Thus according to some example embodiments the fingers 124 combine with the recess 132 to restrict the cross-sectional area of the channel 80 either side of the heater 68 where the wick 66 passes through the channel 72 to pinch or compress the wick 66 to restrict or prevent e-liquid egress whilst the recess 132 prevents interference with the heater 68.

In some examples the sealing element 120 is made from silicon or other suitable material. As explained above, one or both of the fingers 124 or the connecting arms 126 may be resiliently deformable so that as the user pulls on the stalk 122, the fingers 124 deform in shape as a result of the resilient property of the material allowing the fingers 124 to be displaced from the sealing position to a state in which the fingers 124 are removed from the channel 80 and into the vaporization chamber 98.

While the above-described embodiments have in some respects focused on some specific example vapor provision systems, it will be appreciated the same principles can be applied for vapor provision systems using other technologies. That is to say, the specific manner in which various aspects of the vapor provision system function are not directly relevant to the principles underlying the examples described herein.

For example, whereas the above-described embodiments have primarily focused on aerosol provision systems comprising a vaporizer comprising a resistance heater coil, in other examples the vaporizer may comprise other forms of heater, for example a planar heater, in contact with a liquid transport element. Furthermore, in other implementations a heater-based vaporized might be inductively heated. In yet other examples, the principles described above may be adopted in devices which do not use heating to generate vapor, but use other vaporization technologies, for example piezoelectric excitement.

Furthermore, and as already noted, whereas the above-described embodiments have focused on approaches in which the aerosol provision system comprises a two-part device, the same principles may be applied in respect of other forms of aerosol provision system which do not rely on replaceable cartridges, for example refillable or one-time use devices.

Thus there has been described a vapor provision system comprising a reusable part, a cartridge part and a sealing element. The cartridge part comprises a cartridge housing, a reservoir formed within the cartridge housing for containing liquid for vaporization; a vaporizer disposed within an air path forming a vaporization chamber within the cartridge housing; and a liquid transport element or wick arranged within a channel from the reservoir to the vaporization chamber to transport liquid from the reservoir to the vaporizer for vaporization, the liquid transport element being formed with the vaporizer in the vaporization chamber to convey the vapor in use when air is drawn by a user through the air path. The sealing element comprises a flange connected to a stalk for manipulating the sealing element by the user, wherein the flange is configured for disposing within the channel to reduce a cross-sectional area of the liquid transport element in channel.

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention(s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc. other than those specifically described herein, and it will thus be appreciated that features of the dependent claims may be combined with features of the independent claims in combinations other than those explicitly set out in the claims. The disclosure may include other inventions not presently claimed, but which may be claimed in future.

The invention claimed is:

1. A vapor provision system comprising:
   a cartridge part configured for use with a reusable part, the cartridge part comprising
      a cartridge housing,
      a reservoir formed within the cartridge housing for containing liquid for vaporization,
      a vaporizer disposed within an air path forming a vaporization chamber within the cartridge housing, and
      a liquid transport element arranged within a channel from the reservoir to the vaporization chamber to transport the liquid from the reservoir to the vaporizer for vaporization, the liquid transport element being formed with the vaporizer in the vaporization chamber to convey the vapor in use when air is drawn by a user through the air path, and
   a sealing element, the sealing element comprising a plurality of fingers projecting outwardly opposite one another from one end of a stalk, wherein when located in a sealing position the plurality of fingers of the sealing element are configured to extend into the channel to reduce a cross-sectional area of the liquid transport element in the channel and the stalk of the sealing element extends proud of the cartridge part so that the sealing element can be removed by the user before the cartridge part is used.

2. The vapor provision system of claim 1, wherein each of the plurality of fingers is connected to the stalk by a connecting shoulder, and one or both of the plurality of fingers and the connecting shoulders are resiliently deformable so that the sealing element can be removed from the cartridge part before use.

3. The vapor system of claim 2, wherein the vaporizer is disposed with the liquid transport element within the vaporization chamber in the air path as the liquid transport channel emerges from the channel, and the sealing element includes a recess formed at the end of the sealing element, adjacent the plurality of fingers, to accommodate one or both of the vaporizer or the liquid transport element when each of the plurality of opposing fingers are disposed within the channel.

4. The vapor provision system of claim 1, wherein the plurality of opposing fingers when disposed in the channel, when the sealing element is in the sealing position, restrict the cross-sectional area of the liquid transport element in the channel thereby reducing a flow of the liquid from the reservoir through the liquid transport element.

5. The vapor provision system of claim 2, wherein the resiliently deformable plurality of fingers or connecting shoulders are configured so that the plurality of fingers can pass into the vaporization chamber from a non-deformed state in the sealing position to a deformed state when the sealing element is being removed without damaging the heater or the liquid transport element.

6. A sealing element for a cartridge part of a vapor provision system, the sealing element comprising:
   a plurality of fingers projecting outwardly opposite one another from one end of a stalk, wherein when located in a sealing position in the cartridge part the plurality of fingers of the sealing element are configured to extend into a channel in which a liquid transport element of the cartridge part is disposed for transporting liquid from a reservoir to a vaporizer to reduce a cross-sectional area of the liquid transport element in the channel, and the stalk of the sealing element extends proud of the cartridge part, when the sealing element is disposed in a sealing position so that the sealing element can be removed by a user before the cartridge part is used.

7. A package connected to the sealing element of claim 6, the package forming an enclosure around the cartridge part of the vapor provision system, wherein when the cartridge part is removed from the package the sealing element is retained with the package.

8. A method of assembling a cartridge part of a vapor provision system, the method comprising:
   assembling the cartridge part, the cartridge part comprising a cartridge housing, a reservoir formed within the cartridge housing for containing liquid for vaporization, a vaporizer disposed within an air path forming a vaporization chamber within the cartridge housing, and a liquid transport element arranged within a channel from the reservoir to the vaporization chamber to transport the liquid from the reservoir to the vaporizer for vaporization, the liquid transport element being formed with the vaporizer in the vaporization chamber to convey the vapor in use when air is drawn by a user through the air path, the assembling including
      positioning during assembly of the cartridge part a sealing element in a sealing position, the sealing element comprising a stalk for manipulating the sealing element by the user and a plurality of outwardly opposed fingers connected at one end of the stalk, the plurality of outwardly opposed fingers being configured to be disposed within the channel to reduce a cross-sectional area of the liquid transport element in the channel, wherein the positioning of the sealing element during assembly of the cartridge part includes positioning the sealing element at a sealing position in which the plurality of outwardly opposed fingers are disposed in the channel to compress the liquid transport element.

\* \* \* \* \*